(12) United States Patent
Merrild

(10) Patent No.: US 10,570,636 B2
(45) Date of Patent: Feb. 25, 2020

(54) HANGAR SYSTEM FOR LOCAL DRONE STORAGE AND CHARGING

(71) Applicant: Frans Merrild, Hellerup (DK)

(72) Inventor: Frans Merrild, Hellerup (DK)

( * ) Notice: Subject to any disclaimer, the term of this patent is extended or adjusted under 35 U.S.C. 154(b) by 0 days.

(21) Appl. No.: 15/921,432

(22) Filed: Mar. 14, 2018

(65) Prior Publication Data

US 2019/0301192 A1    Oct. 3, 2019

(51) Int. Cl.
*H02J 7/00* (2006.01)
*E04H 6/44* (2006.01)
*B60L 53/31* (2019.01)

(52) U.S. Cl.
CPC .............. *E04H 6/44* (2013.01); *B60L 53/31* (2019.02); *B60L 2200/10* (2013.01)

(58) Field of Classification Search
USPC ....................................... 320/107, 108, 109
See application file for complete search history.

(56) References Cited

U.S. PATENT DOCUMENTS

| | | | |
|---|---|---|---|
| 7,410,125 B2 | 8/2008 | Steele | |
| 7,714,536 B1 | 5/2010 | Silberg et al. | |
| 9,056,676 B1 | 6/2015 | Wang | |
| 9,233,754 B1* | 1/2016 | Wang | B64C 39/024 |
| 9,387,928 B1* | 7/2016 | Gentry | B64C 39/024 |
| 9,957,045 B1* | 5/2018 | Daly | B64C 37/02 |
| 10,040,548 B2* | 8/2018 | Alzahrani | B64C 29/0033 |
| 2016/0340006 A1 | 11/2016 | Tang | |
| 2017/0175413 A1 | 6/2017 | Curlander et al. | |
| 2017/0183074 A1* | 6/2017 | Hutson | B64C 1/061 |
| 2017/0247106 A1* | 8/2017 | Sanlaville | B64C 25/20 |
| 2017/0283090 A1* | 10/2017 | Miller | B60L 53/80 |
| 2018/0208311 A1* | 7/2018 | Zhang | B64C 39/024 |
| 2018/0212446 A1* | 7/2018 | Cheng | H02J 7/0044 |
| 2018/0359036 A1* | 12/2018 | Howard | G01R 29/10 |
| 2019/0166765 A1* | 6/2019 | Maor | B64C 39/024 |
| 2019/0248507 A1* | 8/2019 | Fox | G06K 9/00221 |
| 2019/0291864 A1* | 9/2019 | Liu | B64D 47/08 |

* cited by examiner

*Primary Examiner* — Brian Ngo
(74) *Attorney, Agent, or Firm* — Robert Brownstein

(57) ABSTRACT

The invention is a drone hangar enabling safe containment and recharging of a drone located close to an area of interest, such as a drone used to inspect wind turbines located off shore.

8 Claims, 6 Drawing Sheets

US 10,570,636 B2

HANGAR SYSTEM FOR LOCAL DRONE STORAGE AND CHARGING

TECHNICAL FIELD

System for storing drones in close proximity to a location of interest, and for charging drone batteries on site.

BACKGROUND OF THE INVENTION

With the world more focused on renewable energy sources, wind and wind turbines are enjoying renewed interest and deployment. Most current wind turbines are used for converting wind power into electrical power; and many wind turbines are being deployed offshore where wind is plentiful and not subject to interference by natural or manmade edifices. As with all mechanical systems, wind turbines require periodic inspection and maintenance. Offshore wind turbines, today, are inspected typically by helicopters that must fly from shore, or from a boat deck. This is both time consuming and costly. Using unmanned drones to inspect wind turbines could provide an alternative. However, drones require battery recharging and would ordinarily be deployed from a ship or shore location. Thus, while remotely located drones could lower costs, without local storage and deployment, they would not provide time savings and could impose inspection duration limitations because of charge depletion during travel to and from the site of interest.

BRIEF SUMMARY OF THE INVENTION

The invention herein disclosed and claimed is a system that provides onsite storage and charging of drones in proximity to a site of interest. The system is a hangar structure whose upper portion can be opened, remotely, to provide safe takeoff and landing from the storage and charging platform. When the upper hangar portion is closed, it provides a seal against weather to keep the drone safely tucked away when not in use. By being installed on or near the site of interest, a drone requires much less charge depletion to fly to an inspection site. By offering inductive battery charging while a drone is inside it, the hangar enables the drone to operate longer during inspections before needing to land for recharge. Remote control of the hangar and the drone can be provided by wireless networking infrastructure.

BRIEF DESCRIPTIONS OF THE DRAWINGS

DETAILED DESCRIPTION OF THE INVENTION

Offshore wind turbines are becoming an important source of electric power converted from renewable wind power. Sporting large vain structures that rotate due to wind energy, the rotation is applied to alternating current generators to convert the wind power into commensurate electrical power. Of course, being a mechanical system, a wind turbine requires periodic inspection and maintenance. When located offshore, the inspection and maintenance is often done by helicopters deployed from a ship or an onshore depot. In an emergency situation, the time it takes for a helicopter to arrive at a site may be too long to prevent catastrophic failure. In addition, the cost of manned helicopters doing schedule inspections and maintenance can be a significant one.

One possible alternative to manned helicopters for inspection and light-duty maintenance is using unmanned, remotely operated, drones. However, such devices are known for relatively short duty cycles interspersed with frequent battery charging. Having to fly to an inspection site from a ship or onshore installation would likely reduce the remaining time available for either inspection or maintenance before a drone would have to return for recharging.

The invention herein disclosed and claimed is a hangar system meant to be located at or near inspection sites of interest that provides for takeoff and landing, battery charging, and weather protection. Located atop the turbine structure of a wind turbine, a hangar would allow a drone to quickly takeoff and inspect the entire wind turbine's outer surface within minutes. That could prevent a failure that would otherwise occur due to the time required for a remotely located helicopter or drone to arrive at the wind turbine. By making use of inductive electric charging, the hangar's landing surface could be used to keep a drone's battery or batteries fully charged. And, wireless networking infrastructure could provide a means for remote control of the drone along with fast conveyance of inspection data to an operations station.

Figure 1:
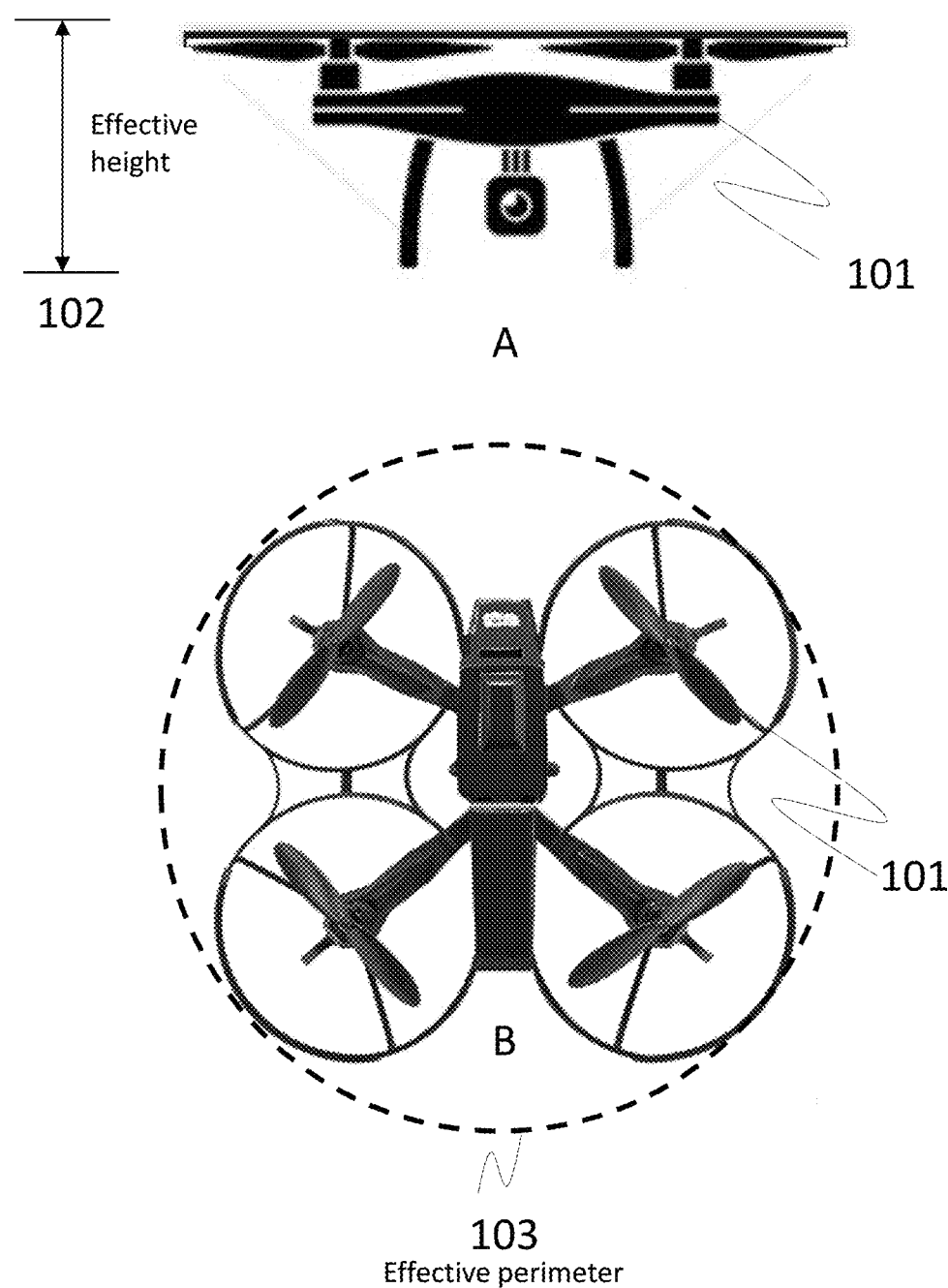
FIG. 1A depicts a front view of a drone equipped with a camera.
FIG. 1B depicts the drone of FIG. 1A from a top view.

As shown in FIG. 1A, drones (101) typically carry an electronic camera capable of high-resolution imaging. That, along with other light-weight instrumentation, would allow a drone to offer comprehensive assessments. As shown (102), the effective height of the drone is the length from its lowest point to its highest point when resting on a horizontal surface.

FIG. 1B shows a top view of a drone (101. Most drones make use of four propellers oriented so that they rotate in the same plane. Differences in propeller speed affect lift, hovering, and turning of the drone. It is typical for operations commands to be conveyed to a drone using wireless signaling. As shown (103), the effective perimeter of the drone is an imaginary circle that contains all substructure extremities extending horizontally when the drone is resting on a horizontal surface.

Figure 2:
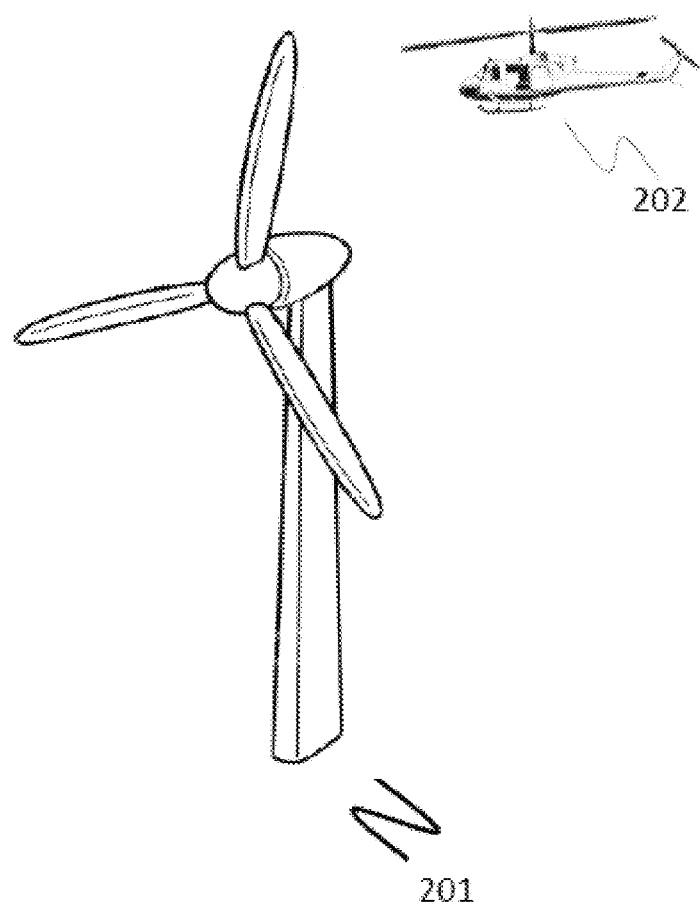
FIG. 2 shows an offshore wind turbine being inspected by a manned helicopter.

FIG. 2 shows an offshore wind turbine (201) being inspected by a manned helicopter (202). This is a very typical inspection scenario. Such helicopters are typically deployed from a ship or an onshore operations depot.

Figure 3:
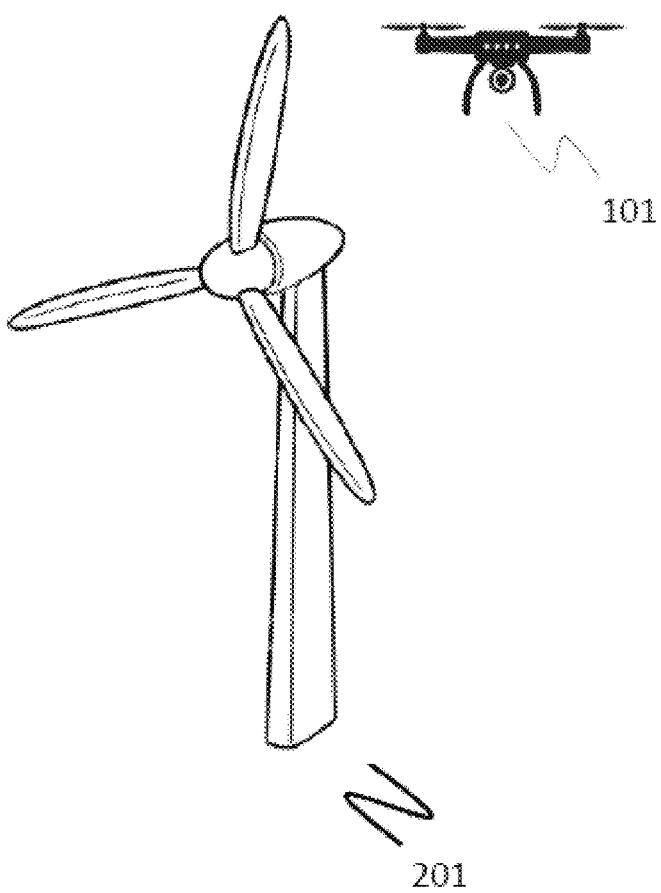
FIG. 3 shows an offshore wind turbine being inspected by an unmanned drone.

FIG. 3 shows an offshore wind turbine (201) being inspected by a drone (101). Note that because of a drone's small size and agility, it may inspect a wind turbine at much closer distances than a helicopter. That can make inspections more precise and accurate than inspections done from afar.

Figure 4:
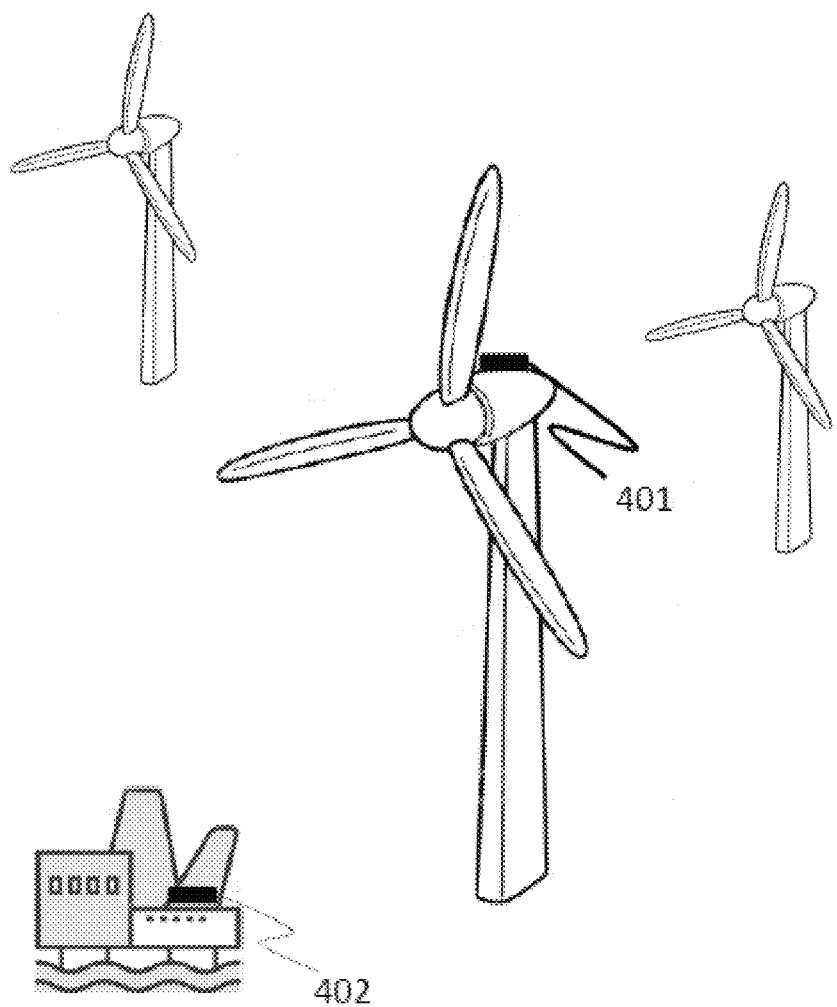
FIG. 4 shows a hangar located on the wind turbine's turbine structure.

FIG. 4 shows the offshore wind turbine of FIG. 3 with a hangar (401) located above its turbine structure (402). The size of the hangar shown is not meant to be to scale. Also note that the hangar could be located on the permanent service structure (403).

Figure 5:
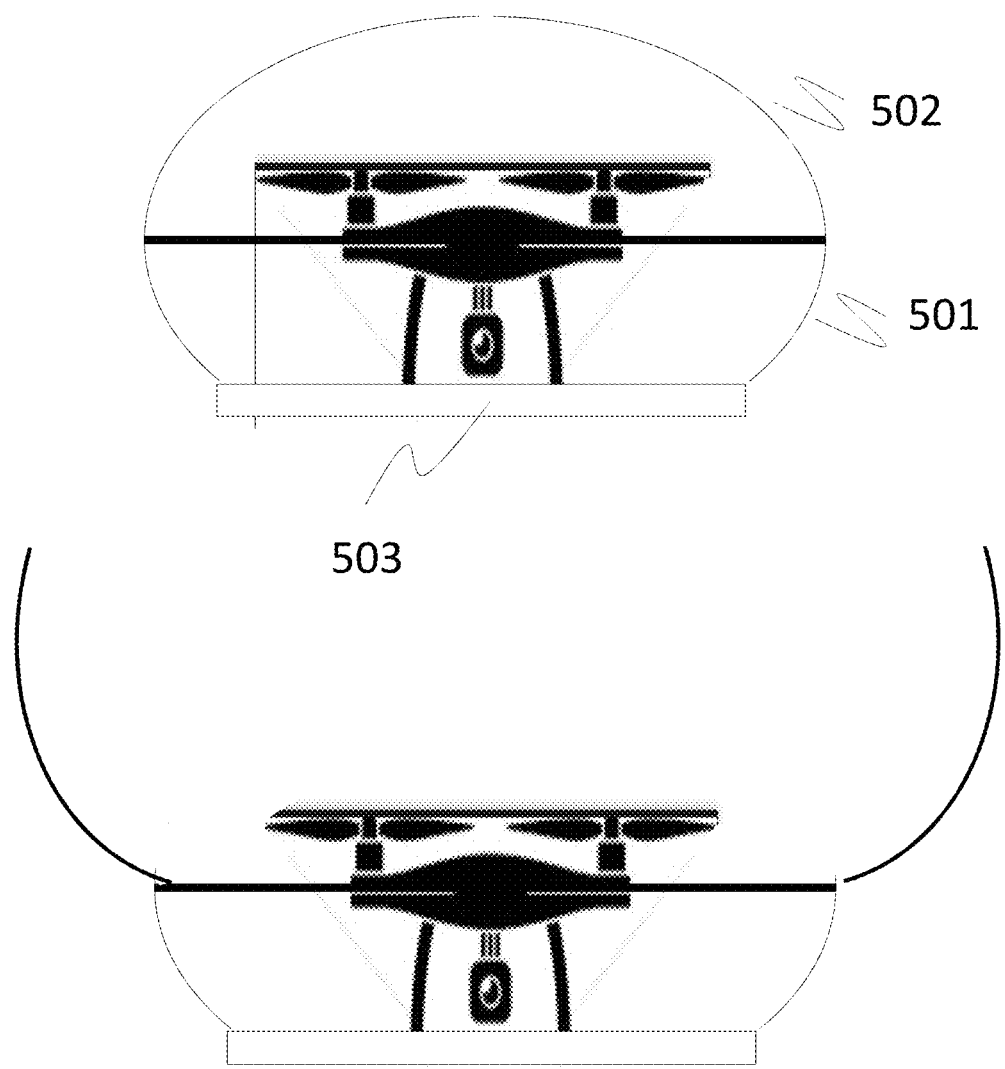
FIG. 5A is a side view of the hangar showing the drone inside with the upper portion closed.
FIG. 5B is a side view of the hangar showing the drone inside with the upper portion open.

FIG. 5A shows a more detailed front view of the hangar 401. The hangar is a bowl-shape lower portion (501) and an inverted bowl-shape upper portion (502) which when conjoined along the edges of each forms essentially an oblate spheroid. This particular shape would be more wind resistant than a cube-shaped structure because the curved surfaces of the oblate spheroid reduce the pressure exerted against it by the wind more than a planar surface would. The bottom portion has a flat circular floor (503) and the upper portion is divided into essentially bowed triangular segments of essentially the same size and shape wherein the apex of each abuts the other segments' apexes, and the sides opposite the apexes are hinged at the edges where the upper and lower portions conjoin. This allows each segment to rotate upward and outward with the conjoining edges of the upper and lower portion acting as axes of rotation. Note that the lower portion floor (503) supports the parked drone and can be equipped with inductive charging technology that provide inductive charging for a parked drone's one or more batteries until same are fully recharged.

FIG. 5B shows a front view of the hangar from FIG. 4A with the upper portion (502) fully open.

Figure 6:
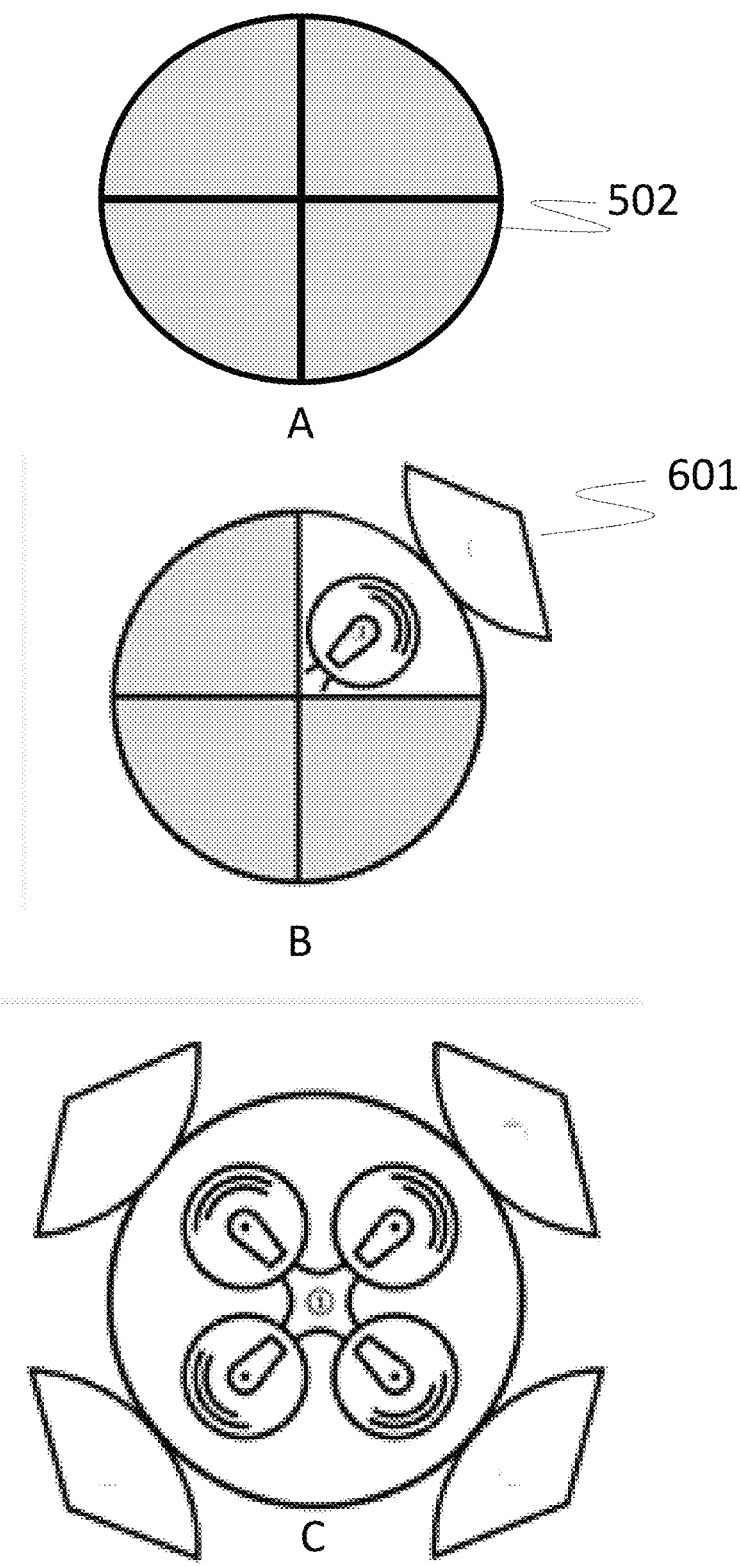
FIG. 6A shows a hangar from a top view with the upper portion closed.
FIG. 6B shows a hangar, such as FIG. 6A, from a top view with one of the upper portion segments open.
FIG. 6C shows a hangar, such as FIG. 6A, from a top view with all upper portion segments open.

FIG. 6A shows a top view of the hangar where the upper portion (502) is closed providing a weather-resistant enclosure for a drone located inside the hanger.

FIG. 6B shows one of the upper portion segments rotated upward (601) exposing a portion of the drone inside. This is meant to illustrate that the top portion 402 is segmented. Opening and closing of the top portion would typically involve the rotation of all segments concurrently.

FIG. 6C shows the drone located inside the hangar after all the upper portion segments have been rotated fully upward and outward. The drone located inside the hangar can then takeoff vertically or land vertically. While located inside the hangar, typically, the upper portion segments would be closed as in FIG. 6A.

By using inductive charging rather than a physical connection interface, the drone's position need not be rigidly fixed when parked inside the hangar.

A wireless network infrastructure associated with the hangar can provide a means of remotely signaling the drone to control its operation, and as a way for conveying image and other detection data to an operations sensor during inspection. The same network would convey the control signals to the hangar for opening and closing the upper portion segments.

This disclosure shows the hangar and drone being used for inspection of offshore wind turbines. This is meant to be exemplary. Other offshore structures, such as oil platforms, could also make use of locally stored and charged drones. In addition, coast guard stations may make use of locally hangered drones to inspect off-shore incidents and accidents.

The disclosure and drawing show the hangar mounted to one portion of an offshore wind turbine. This is meant to be exemplary. The hangar could be mounted elsewhere.

The hangar as disclosed is oblate spheroid shaped. This is exemplary. The hangar may have other physical shapes. The key is to enable a safe storage and charging environment for a drone that makes takeoff and landing obstruction free when the upper portion is opened. Hangar dimensions are not critical. The area of any lower portion floor should be larger than the footprint of the largest drone expected to be housed inside. The height of the sides of the lower portion and upper portion combined should exceed the maximum height of any drone expected to be housed inside.

The hangar may be made out of a variety of rigid weather-resistant materials, such as metals or non-metals, so long as they provide adequate protection from worst-case weather expectations. For example, thickness and rigidity should enable the hangar structure to survive intact under wind speed that exceed worst-case expectations. Mounting fixtures used to mount the hangar to a local structure should also be able to withstand more than worst-case wind speeds without shearing or loosening.

What is claimed is:
1. A drone hangar system comprising:
   a bowl-shaped lower portion comprising a flat circular floor and curved side substructure;
   said flat circular floor is attached to interior side of said curved side substructure;
   a bowl-shaped upper portion comprising bowed, triangular segments whose apexes meet at the center of said upper portion and whose sides opposite said apexes comprise a composite edge of said bowl-shaped upper portion;
   edge of said curved side substructure of said bowl-shaped lower portion and said composite edge of said bowl-shaped upper portion are conjoined to form essentially a closed oblate spheroid;
   perimeter of said flat circular floor must be larger than effective perimeter of largest drone to be accommodated; and
   vertical diameter of said closed oblate spheroid must be larger than effective height of tallest drone to be accommodated.
2. A claim as in claim 1 further comprising:
   said flat circular floor operative to provide inductive charging for one or more batteries powering said drone to be accommodated.
3. A claim as in claim 1 further comprising:
   said triangular segments rotated upward and downward by an electromechanical subsystem.
4. A claim as in claim 1 further comprising:
   a wireless network infrastructure operative to convey control signals to said drone to be accommodated;
   said wireless network infrastructure operative to convey said control signals to said hangar's said electromechanical subsystem for opening and closing said triangular segments of said upper portion;
   said wireless network infrastructure operative to convey real-time image and sensor data from said drone to said hangar and to said wireless network user.
5. A claim as in claim 3 further comprising:
   said electromechanical subsystem powered by a wind turbine's electrical generating subsystem.
6. A claim as in claim 4 further comprising:
   said wireless network infrastructure powered by said wind turbine's said electrical generating subsystem.
7. A claim as in claim 6 further comprising:
   a plurality of drone hangar systems wherein each said hangar system is located such that said drone, with said one or more batteries fully charged, compatible with said inductive charging, can fly from one said hangar system to next said hangar system without needing to recharge said one or more batteries before landing and recharging.

8. A claim as in claim 7 further comprising:
a drone-range-extending-control program, wherein commands are conveyed over said wireless network, operative to guide said drone, automatically, from said hangar system to said hangar system, to control successive landing, charging, and take off, so as to extend the range of said drone.

\* \* \* \* \*